(12) United States Patent
Vodavoz

(10) Patent No.: US 7,984,939 B2
(45) Date of Patent: Jul. 26, 2011

(54) PROTECTION MEANS FOR ROAD VEHICLES

(76) Inventor: Mordechai Vodavoz, Moshav Zelafon (IL)

( * ) Notice: Subject to any disclaimer, the term of this patent is extended or adjusted under 35 U.S.C. 154(b) by 452 days.

(21) Appl. No.: 11/918,113

(22) PCT Filed: Apr. 20, 2006

(86) PCT No.: PCT/IL2006/000495
§ 371 (c)(1),
(2), (4) Date: Feb. 19, 2009

(87) PCT Pub. No.: WO2006/106525
PCT Pub. Date: Oct. 12, 2006

(65) Prior Publication Data
US 2009/0267366 A1    Oct. 29, 2009

(30) Foreign Application Priority Data
Apr. 7, 2005 (IL) .......................................... 167921

(51) Int. Cl.
*B60R 19/20* (2006.01)
(52) U.S. Cl. ............ 293/107; 293/118; 701/45; 342/72; 180/274; 296/187.06
(58) Field of Classification Search ................... 293/107, 293/118, 119, 134, 137; 701/45; 342/72; 180/274
See application file for complete search history.

(56) References Cited

U.S. PATENT DOCUMENTS

| | | | |
|---|---|---|---|
| 3,822,076 A * | 7/1974 | Mercier et al. ................ | 293/107 |
| 3,930,667 A | 1/1976 | Osuchowski et al. | |
| 4,215,878 A | 8/1980 | Hirbod | |
| 4,411,462 A | 10/1983 | Buehrig et al. | |
| 4,474,257 A * | 10/1984 | Lee ................................ | 180/271 |
| 4,518,183 A | 5/1985 | Lee | |
| 4,930,823 A | 6/1990 | Rivera | |
| 5,725,265 A * | 3/1998 | Baber .......................... | 293/107 |
| 6,056,336 A * | 5/2000 | Balgobin ...................... | 293/107 |
| 6,106,038 A * | 8/2000 | Dreher .......................... | 293/118 |
| 6,450,556 B1 * | 9/2002 | Jacobs .......................... | 293/107 |
| 6,749,218 B2 * | 6/2004 | Breed .......................... | 280/735 |
| 6,848,709 B2 | 2/2005 | Nagatsuyu | |
| 6,882,916 B2 * | 4/2005 | Takafuji et al. ................. | 701/45 |
| 6,883,631 B2 * | 4/2005 | Hu et al. ....................... | 180/274 |
| 6,923,483 B2 * | 8/2005 | Curry et al. .................... | 293/107 |
| 6,950,014 B2 * | 9/2005 | Rao et al. ...................... | 340/438 |
| 7,753,159 B2 * | 7/2010 | Kim et al. ...................... | 180/274 |
| 2004/0032132 A1 | 2/2004 | Yang | |

(Continued)

FOREIGN PATENT DOCUMENTS

| | | |
|---|---|---|
| CN | 1130137 | 9/1996 |
| CN | 1351936 | 6/2002 |
| DE | 4320226 A1 * | 1/1994 |
| DE | 10316847 A1 * | 11/2004 |

(Continued)

*Primary Examiner* — Jason S Morrow
(74) *Attorney, Agent, or Firm* — Robert G. Lev; Michael Factor

(57) ABSTRACT

A reusable system for cushioning impacts to a vehicle comprising: a bumper mounted via shock absorbers to the chassis of the vehicle; a remote sensor for detecting location and relative velocity of objects in proximity of the vehicle; a processor; a primary airbag mounted within the bumper, expandable outwards from some bumper upon inflation; an inflator for the primary airbag; a valve for releasing gas from the primary airbag and a retractor for compressing primary airbag, wherein a signal from processor indicating imminent impact triggers inflation of primary airbag beyond bumper protecting bumper and retractor collapses airbag for reuse.

10 Claims, 6 Drawing Sheets

U.S. PATENT DOCUMENTS

| | | |
|---|---|---|
| 2004/0107033 A1 | 6/2004 | Rao et al. |
| 2004/0262894 A1* | 12/2004 | Kempf ..................... 280/730.1 |
| 2005/0035608 A1 | 2/2005 | Larsen et al. |
| 2006/0186702 A1* | 8/2006 | Kisanuki et al. ......... 296/187.04 |
| 2006/0202492 A1 | 9/2006 | Barsova-Carter et al. |
| 2009/0152041 A1* | 6/2009 | Kim ............................ 180/274 |
| 2010/0030433 A1* | 2/2010 | Suzuki ........................... 701/45 |
| 2010/0116580 A1* | 5/2010 | Choi ............................ 180/274 |

FOREIGN PATENT DOCUMENTS

| | | |
|---|---|---|
| GB | 2381400 | 4/2004 |
| JP | 56138046 A | 10/1981 |
| JP | 62168746 | 7/1987 |
| JP | 08230610 | 3/1998 |
| JP | 10230865 | 2/2000 |
| JP | 2001071855 | 3/2001 |
| JP | 2006-232089 A * | 9/2006 |

* cited by examiner

PROTECTION MEANS FOR ROAD VEHICLES

FIELD OF THE INVENTION

The present invention is directed to providing a multi-level protection system for road vehicles, which includes a reusable air bag means for cushioning impacts.

BACKGROUND OF THE INVENTION

Cars and other road vehicles include protective means designed to protect the driver and passengers in the event of a crash. Most popular of these, and required in many jurisdictions by law, are seatbelts and airbags. To protect the vehicle itself from minor dents and the like, such as during parking in confined spaces, bumpers are provided. Bumpers are designed to protect from small impacts, elastically deforming to absorb the energy of minor impacts and absorbing the energy of heavier impacts by being crushed or otherwise plastically deformed. Bumpers are typically cheaper to mend or replace than other car parts, and minimize the likelihood of damage to the car chassis which can effect the safety of the vehicle and significantly reduced the worth thereof.

Apart from airbags designed to cushion and protect the driver of a vehicle from being thrown forwards when the vehicle is brought to a sudden stop on impact, airbags designed to protect pedestrians during impact by the vehicle, and to protect the bumpers of vehicles from damage during impacts or to work with the bumper to protect the chassis and occupants are also known.

U.S. Pat. No. 4,411,462 for example, describes an automobile front-end construction incorporating an air bag. In this patent, the front end construction for an automobile body having an essentially rigid, forward mounting structure is described. The front end construction includes a bumper yieldably mounted on a fixed, lightweight, crushable and collapsible supporting frame disposed ahead of the engine compartment of the vehicle and containing a normally folded airbag. The bumper is adapted to absorb relatively light rearwardly directed impact forces without effect on the supporting frame or the air-bag, the supporting frame being adapted to crush under relatively heavier impact forces sufficient to overwhelm the impact resistance capability of the bumper, and the air-bag adapted to explode under the heavier impact forces referred to which are greater than that required to at least initiate crushing of the supporting frame but less than that required to completely collapse it.

In the system of U.S. Pat. No. 4,411,462, the airbag protects the vehicle from impacts large enough to overcome the protection provided by the bumper and supporting frame, providing additional protection to the chassis and passengers. The bumper and supporting frame are designed to absorb small and moderate sized impacts and to suffer damage accordingly, with the airbag only coming into action to protect against large impacts.

U.S. Pat. No. 4,518,183 describes an extendible safety impact bag for a vehicle wherein a detection apparatus senses that the vehicle a or an approaching object in the path of the vehicle is traveling at a dangerous speed, and extends the bumper forwardly or rearwardly from the body of the vehicle while at the same time filling the space between the body and bumper with an inflated air bag. Should the impact not take place, or the dangers facing the vehicle decrease, the apparatus retracts to its initial inoperative condition. One form incorporates a first filled bag which is filled at all times, and then a second bag which is inflated when the bumper is extended. A modified form moves an elongated bag into position with its longer dimension filling the space between the body of the vehicle and the bumper, and correspondingly returns the bag so that its shorter dimension fits in between the retracted bumper and the body of the vehicle.

The system described will detect and protect the vehicle to which it is mounted, from serious impacts. The airbag is self-deflating and thus the system is reusable. It appears that small impacts and the like are absorbed by the bumpers in the usual way.

United States Patent Application Number US20040107033 describes a pre-crash sensing system for a vehicle having external airbags. The external airbag system may include a bumper airbag, a grill airbag or both. The system is automated, in that an object classifier used to generate an object classification signal is provided. A controller coupled to the object classifier and the external airbag system varies the activation level of the external airbag system in response to the object classification signal. The system described senses an impact before it happens and deploys a countermeasure that consists of varied activation level of the external air bag connected to vehicle, in response to the vehicle classification signal.

When activated, the airbag provides a degree of protection, but either the system will lack sensitivity and small bumps will be absorbed by the bumpers, or the airbag will be regularly triggered by poor parking and the like, requiring the vehicle to be taken in for servicing so that the airbag can be packed away.

Recognizing the above problem, although directed apparently to internal airbags, Japanese Patent Application No. JP 10230865 describes a collision energy absorbing structure of vehicle designed to effectively absorb collision loads without erroneously spreading an air bag at light collision.

U.S. Pat. No. 4,930,823 describes a vehicle bumper structure including a shock absorber, having an impact member biased outwardly from shell.

Apparently, relatively minor impacts are absorbed by the bumper, which has a padded outer portion. Heavy impacts release an airbag.

Japanese Publication Number JP 62168746 describes an air bag device that is stowed within a rear or front bumper take element, and released when a collision forecasting device forecasts the collision of the vehicle. The air bag is concealed behind a cover within the bumper and urged forwards by a spring. When a collision is forecasted by a controller, a locking device is released to supply gas into the air bag from a gas generator, and the air bag is expanded.

The device described is designed to prevent physical contact with structural elements on impact, with all contact occurring with airbag. Although such a device will, if effective, prevent structural damage to vehicle or bumper, it would appear that the airbag will be released by poor parking or other small impacts, requiring resetting, presumably in a service station or workshop.

Japanese Publication Number JP56138046 describes a system including an inflated bumper and a signal generator that generates a slow down signal when air pressure thereagainst is increased, indicating that an obstacle is contacting the bumper.

U.S. Pat. No. 4,215,878 describes a resilient bumper having a quantity of compressed gas therein. Attached to the resilient bumper are one or more valve assemblies. An impact on the bumper releases compressed gas into a passageway that is connected directly to one or more air bags. The system described appears to provide a solution to both minor and major impacts, but a major impact sufficient to release compressed air into the airbag will apparently require maintenance to deflate and pack the airbag away again. Additionally, since inflation of the airbag is impact triggered, the passengers and drivers of the vehicle will be significantly discomforted in any impact.

United States Patent Application No. US20040032132 describes a bumper system for a motor vehicle having bumpers mounted on hydraulic cylinders, such that hydraulic oil pressure sensor triggers inflation of the air bag of the vehicle.

Remote sensing systems for mounting on a vehicle, capable of sensing other vehicles and calculating probability of collisions are known. For example, British Patent Number GB2381400 describes a vehicle collision prevention system utilizing radar. Such systems may trigger warnings to the driver and or release airbags and other automatic safety systems.

Chinese Patent Application No. CN1351936 describes a method and device for actively reducing injury and damage of automobile collision accident including air bags in both front and back bumpers. Obstacles in front of and behind the automobile are monitored by means of velocity radar and the speed of the obstacles and the automobile itself are compared. In case of emergency, the air bags are opened out to protect person and automobile. The system described is designed to protect car and passengers, pedestrians and other vehicles.

U.S. Pat. No. 4,474,257 describes yet another impact safety system for vehicles that senses proximal object by radar, for example, and causes partial inflation of bags in bumper when collision is imminent. Actual impact causes the air bag to rapidly fill to its fullest capacity to minimize damage to the two vehicles and to the passengers therewithin.

It will be appreciated that unnecessary triggering of an airbag, due to false alarms is inconvenient to the drivers and passengers of the vehicle to which the airbag is mounted, resulting in a need to service the vehicle pack away the airbag and replenish the inflation gas. On the other hand, not triggering the airbag where necessary can result in costly damage to property and persons.

Japanese Publication Number JP 08230610 describes a pedestrian protective device designed to prevent unnecessary unfolding of air bags by precisely discriminating collisions.

Chinese Publication Number CN1130137 describes yet another motor vehicle traveling safety device. An infrared signal system detects imminent collision and cuts power to the engine. Collision impacts are absorbed by soft and hard bumpers in turn, and, if necessary, an airbag is released. Unlike other systems described hereinabove, the air bag frame includes a supporting net and restoring mechanism. Apparently, the airbag may be automatically folded away after use.

The prior art thus indicates that there has been a great deal of activity directed to protecting vehicles and their passengers in the event of crashes, including bumpers, airbags, radar systems and the like. The continuous development in this field is indicative that there is a real need for a system that protects vehicles, their occupants and pedestrians. Such a system is preferably reliable and reusable, and none of the above systems truly fulfills this need. Ideally embodiments of such a system should be retrofittable to existing vehicles, or integral to new models. A narrow patent is sought for the present invention, which is directed to fulfilling this need.

SUMMARY OF THE INVENTION

The present invention is directed to providing a reusable system for cushioning impacts to a vehicle comprising: a bumper mounted via shock absorbers to the chassis of the vehicle; a remote sensor means for detecting location and relative velocity of objects in proximity of the vehicle; a processor; a primary airbag mounted within the bumper, expandable outwards from some bumper upon inflation; an inflation means for the primary airbag; a valve for releasing gas from the primary airbag and a retracting means for compressing primary airbag, wherein a signal from processor indicating imminent impact triggers inflation of primary airbag beyond bumper protecting bumper and retracting means collapses airbag for reuse.

Preferably, the reusable system further comprises a means for monitoring the velocity of the vehicle.

Optionally and preferably, the reusable system further comprises sealed air cushions within bumper that prevent crushing of bumper if force of impact overcomes resistive effect of primary airbag.

Additionally, in preferred embodiments, the bumper of the system comprises an inner curved plate and an outer curved plate, situated across width of said bumper, configured such that inner curved plate has a concave profile facing outwards and curves outwards along its length, away from the chassis of the vehicle such that ends thereof protrude away from the chassis, and the second curved plate is curved such that its ends curve towards the chassis; the outer plate having a convex profile on its outer surface.

The shock absorbers operate in series with the primary airbag and protect chassis during severe impact and typically include elements selected from the list of helical springs and leaf springs.

Preferably the reusable system includes a sensor for detecting movement of the shock absorbers that triggers automatic release of internal airbags for protection of personnel within vehicle.

The remote sensor means is typically selected from the list of radar, sonar, optical and infra-red detection means.

The inflation means for the primary airbag typically comprises a reservoir of compressed gas that may be a gas cylinder that is replaceable or refillable, or may be coupled to a compressor powered by the battery of the vehicle, for example.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION OF THE EMBODIMENTS

Figure 1:
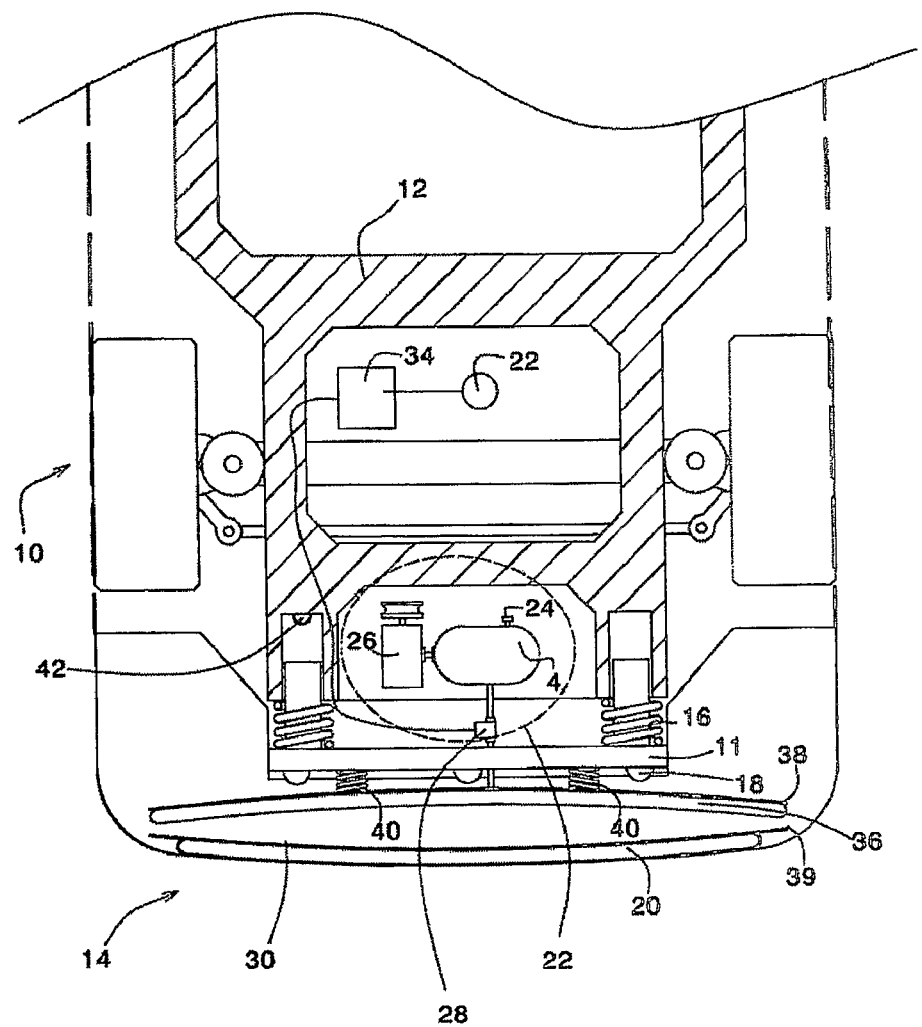
FIG. 1 is a schematic cross-section view, from above, through a reusable system for cushioning impacts to a vehicle in accordance with a first embodiment of the present invention.
Figure 2:
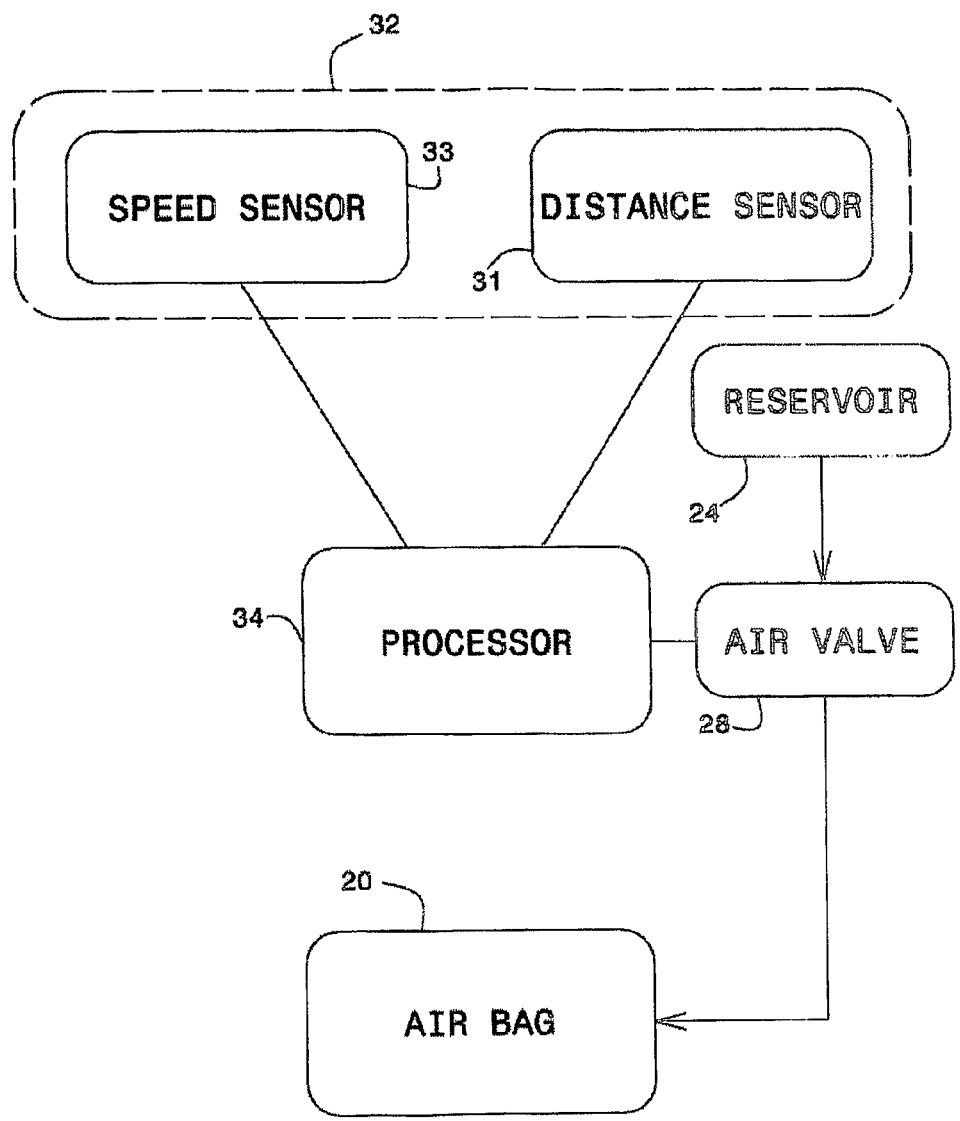
FIG. 2 is a schematic block diagram of elements of one embodiment of the present invention.

Referring now to FIG. 1, wherein a section through the chassis 12 of a vehicle 10 including a first embodiment of the reusable system for cushioning impacts to vehicles is shown, and FIG. 2, wherein a functional block diagram of the primary airbag operation system is shown. The reusable system includes a bumper 14 mounted, via shock absorbing means to the chassis 12 of the vehicle 10, preferably via a min cross bar 11 thereof. The shock absorbing means shown include primary spring elements 16, typically helical springs or leaf springs, and elastomeric shock absorbers 18. A primary airbag 20 is provided, stowed away within the bumper 14. An inflation means 22 for inflating the primary airbag 20 is provided. The inflation means 22 includes a reservoir 24 of compressed gas. This may be a replaceable cylinder of a preferably inert bottled gas such as nitrogen or carbon dioxide containing sufficient gas to inflate the primary airbag 20 several times between requiring replacement or refilling. However, the reservoir may contain compressed air and be filled and pressurized via a compressor 26 that is connected to and powered by an electrical power source, typically the accumulator (battery) of the vehicle 10. An inflation valve 28 is provided for inflating the primary airbag 20. In the first embodiment, the inflation valve 28 is a one-way valve, and a separate deflation valve 30 is provided for deflating the primary airbag 20. In other embodiments, the inflation valve 28 is a sealable valve and deflation of the primary airbag 20 is achieved by operation of the compressor 26 in reverse, sucking air out of the primary airbag 20 and reservoir 24 whilst the inflation valve 28 is open. Subsequent to deflation, the inflation valve 28 is closed and the reservoir 24 may then be pressurized. Where the separate deflation valve 30 is provided, and optionally where deflation is achieved by operation of the compressor 26 in reverse, a mechanical compression means exerts a force on the airbag 20 that helps drive air out therefrom. The mechanical compression means may include metal bands or a network of elastic strings that surround the inflated airbag applying a compressive force thereto.

The primary airbag 20 preferably expands forwards and assumes a generally conical or wedge shape. On impact, the primary airbag 20 will be squashed an substantially flattened, protruding both upwards and downwards in a vertical plane and providing additional protection to impacted pedestrians, for example.

A remote sensor means 32, such as a radar, sonar, optical or infra-red detection means is provided that monitors distance 31 and relative velocity of objects 33 in the proximity of the vehicle 10. Ideally, the remote sensor means monitors objects over a 150° radius of view. If radar or sonar based, a transmitter and detector are provided, whereas an infrared system may be active or passive. The remote sensor means 32 is connected to a processor 34 or computer that calculates the likelihood of impact and activates airbag 20 by controlling the inflation valve 28. Preferably, the processor 34 directly monitors the absolute velocity of the vehicle 10 to which it is mounted, thus providing information as to whether the relative velocity of surrounding objects is due to their movement or movement of the host vehicle. This enables more accurate settings for airbag 20 inflation. Indeed, details of the particular driver's reactions, braking distances and other parameters may be fed to the processor 34, either generally when a driver takes the wheel, for example, or, may be ascertained during the drive, enabling the airbag inflation to be linked to driver alertness, road conditions and the like.

Additionally to automatic activation, it is preferable that the primary airbag 20 be inflatable under driver control, perhaps by operation a control switch. Additionally or alternatively, automatic inflation of the primary airbag 20 may be automatically triggered in response to emergency braking, skidding or the like.

Thus a signal from the processor 34 indicating imminent impact triggers inflation of the primary airbag 20 beyond the bumper 14, protecting the structure of the bumper 14, and after impact or false alarm, the retracting means collapses the airbag 20 for reuse.

Preferably, the reusable system of the invention includes additional impact absorbing elements, such as a sealed air cushion 36 within the bumper 14 that prevent crushing of the bumper 14 if the force of impact overcomes the resistive effect of the first airbag 20. The sealed air cushion 36 within the bumper may be mounted on a curved plate 38, which is curved concave side forwards. Plate 38 may be fabricated from an impact resisting tough material, such as steel, that may itself be mounted on springs 40 or the like. The primary airbag 20 is preferably mounted on a second curved plate 39 that is curved in opposite direction to plate 38, i.e. convex side outwards. During impacts, plates 38, 39 straighten and absorb large amounts of energy thereby.

It will be appreciated that the various impact absorbing elements will start to function under different forces of impact, and at high energy impacts will operate in tandem, so if, for example, the airbag 20 is insufficient to protect the bumper 14, the sealed air cushion 36, plate 38, shock absorbers 18 and springs 16, 40 may individually or severally come into operation, preventing damage to the chassis 12 of the vehicle 10, and hard jolting to the driver and passengers therewithin.

Preferably, a movement or pressure sensor 42 is provided behind the springs 16. This sensor 42 is connected to the driver airbag and passenger airbags where provided, such that compression of the springs 16, resulting from a hard impact, triggers the driver airbag and passenger airbags providing additional protection to personnel within vehicle 10.

During controlled parking, at speeds of, say, 10 km/h, in first or reverse gear, the primary airbag 20 remains deflated. Within heavy traffic, for example, where vehicle 10 typically moves at speeds of between 10 and 30 km/h, for example, perhaps alternating between first and second gear, the primary airbag inflates to provide protection, protruding forwards from bumper 14, perhaps by 25 cm or so. When vehicle 10 starts to move smoothly and pick up speed, without any danger of impact being detected, the primary airbag 20 will deflate back into bumper, providing an aerodynamic profile to the vehicle 10.

At higher speed impacts, the internal airbag 36 becomes squashed absorbing some of the impact, and curved plates 38 and 39 are rammed together and straighten up. At yet higher speed impacts, the helical springs 40 and 16 compress absorbing the shock, and only when force is transmitted through to chassis 12 and sensor 42 is activated, lighting a warning light on dashboard for example, is it necessary to take vehicle to garage for examination and servicing. Preferably, the sensor 42 also releases internal airbag.

Figure 3:
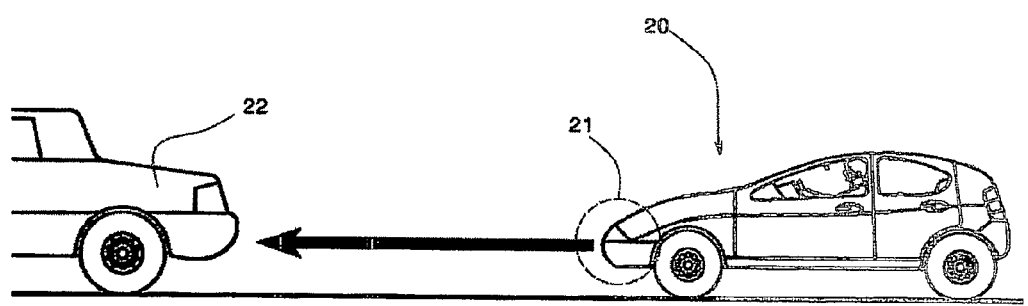
FIG. 3 is a side view of a vehicle including a reusable system of the present invention, the airbag thereof being fully deflated and stowed within the bumper thereof.
Figure 4:
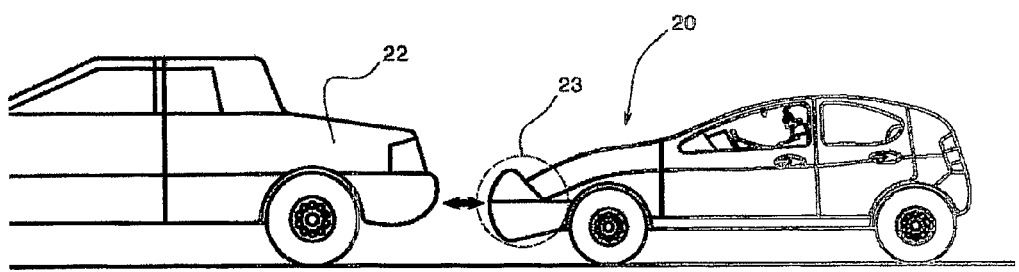
FIG. 4 shows the airbag of the reusable system being inflated and protruding above and below the bumper to cushion impact with a second vehicle.

With reference now to FIGS. 3 and 4, under normal driving conditions, when vehicle 10 including reusable system described hereinabove keeps a safe distance from other vehicles 110, the airbag 20 is stowed away within the bumper 14 thereof, perhaps behind a decorative strip or panel 21. If host vehicle 10 approaches too close to another vehicle 110, taking into account relative speeds as well as distances, and a danger of impact is detected, the processor 34 (FIGS. 1, 2) causes the primary airbag 20 is inflated, either automatically by remote sensor means 32 (FIGS. 1, 2) or by driver 5. The airbag protrudes forwards from structural body of bumper 14, providing a first layer of protection. When danger passes, the primary airbag 20 deflates back into the bumper 14 for reuse.

Figure 5:
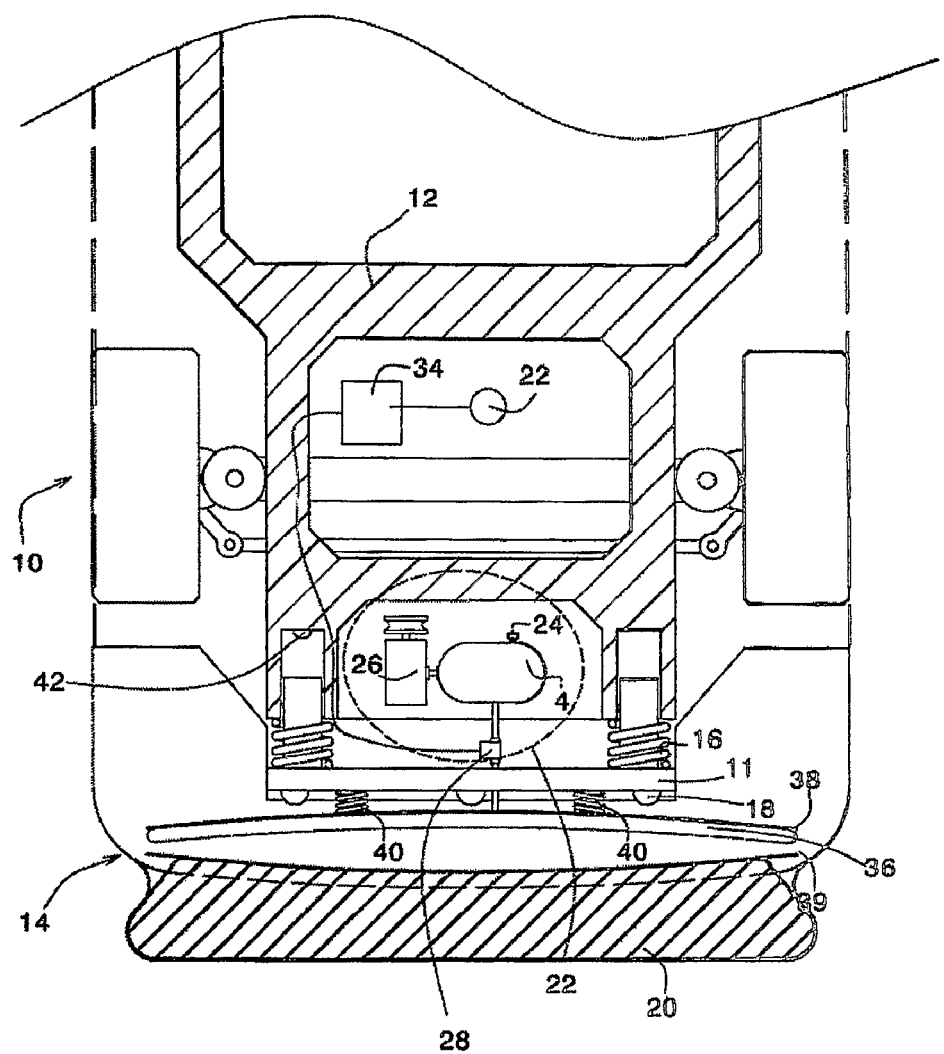
FIG. 5 is a schematic cross-section view, from above, through the chassis of a vehicle having a reusable system of the invention with the airbag thereof inflated and extending beyond the bumper.

Referring to FIG. 5, the specific embodiment of FIG. 1 is shown, in similar schematic cross-section view from above; the airbag 20 thereof in its inflated configuration, extending beyond the bumper 14.

Figure 6:
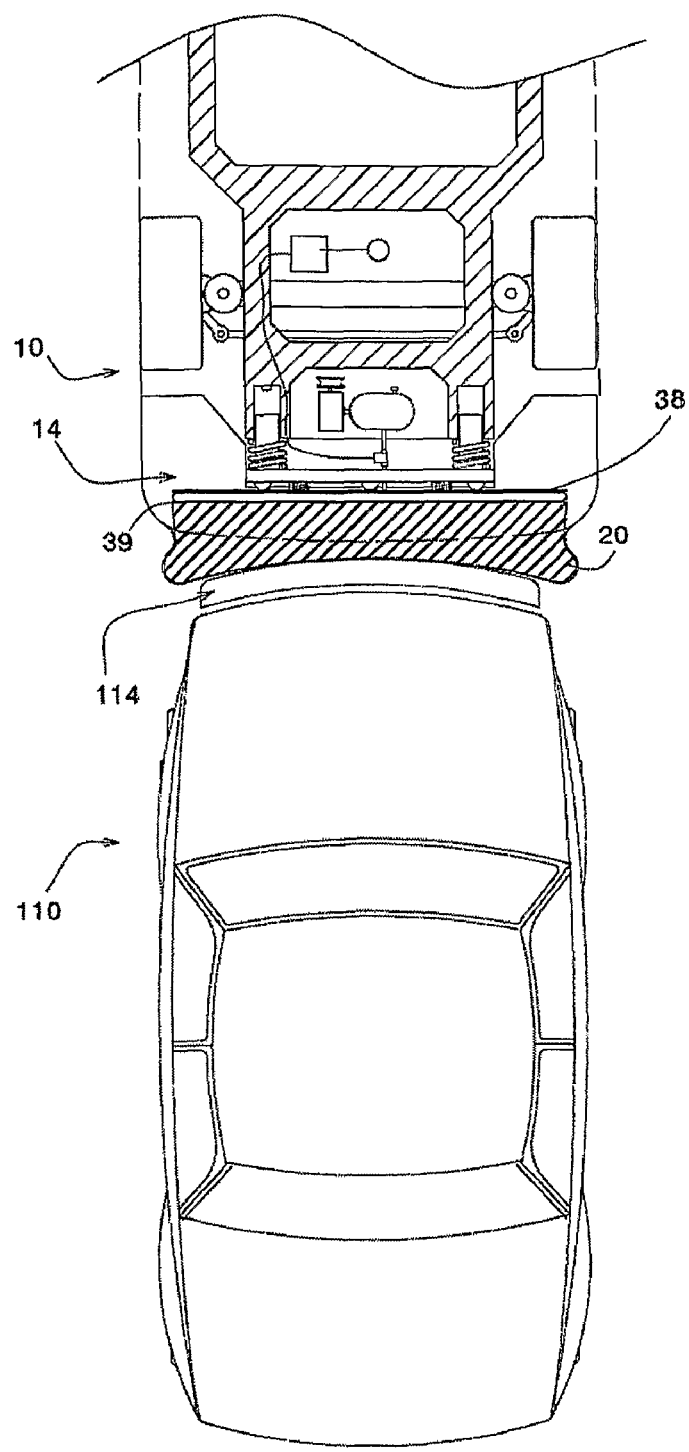
FIG. 6 is a schematic cross section view, from above, through the chassis of a vehicle having a reusable system of the invention with the airbag thereof inflated, and the vehicle impacted, resulting in the curved plates being straightened to absorb energy of impact and the airbag being squashed between vehicle and impacted body, and flattened thereby.

As shown in FIG. 6, if an impact actually occurs, say with the bumper 114 of a second vehicle 110, the airbag 20 will be squashed and flattened between the host vehicle 10 and the impacted body, in this case the second vehicle 110. The curved plates 38, 39 described hereinabove will be forced against each other and straightened under the impact, absorbing much of the energy of the impact thereby and protecting vehicle 10, particularly the chassis 12 thereof, and passengers therein.

The system described above may also be configured to activate headlights, brake lights and hooter of host vehicle 10 to warn pedestrians and other cars of danger of impact.

It will be appreciated that the system as described hereinabove, may be applied to front bumpers of a vehicle, rear bumpers thereof or both. Such a system may be retrofitted to a prior art vehicle, replacing or fitting onto the main cross bar attached to the chassis, or may be supplied with new vehicles.

Dimensions and part specifications are not given herein, as it will be appreciated that since the force of impact between bodies depends on their relative velocity and mass, clearly the system will need to be adapted to different host vehicles of different mass. Similarly, the requirements are, to a large extent dependent on the size and shape of the host vehicle, state of roads, driving habits and other variables.

Thus persons skilled in the art will appreciate that the present invention is not limited to what has been particularly shown and described hereinabove. Rather the scope of the present invention is defined by the appended claims and includes both combinations and subcombinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A reusable system for cushioning impacts to a vehicle comprising:
   a bumper mounted via shock absorbers to the chassis of the vehicle;
   a remote sensor means to detect location and relative velocity of objects in proximity of the vehicle;
   a processor;
   a primary airbag mounted within the bumper, expandable outwards from the bumper upon inflation;
   an inflation means coupled with the primary airbag;
   a valve for releasing gas from the primary airbag and a retracting means to compress primary airbag, wherein a signal from processor indicating imminent impact triggers inflation of primary airbag beyond the bumper thereby protecting the bumper and retracting means collapses airbag for reuse.

2. The reusable system of claim 1, further comprising at least a first sealed air cushion within bumper to prevent crushing of bumper if force of impact overcomes resistive effect of primary airbag.

3. The reusable system of claim 1 wherein said bumper comprises an inner curved plate and an outer curved plate, situated across width of said bumper, configured such that inner curved plate has a concave profile facing outwards and curves outwards along its length, away from the chassis of the vehicle such that ends thereof protrude away from the chassis, and the outer curved plate is curved such that its ends curve towards the chassis; the outer plate having a convex profile on its outer surface.

4. The reusable system of claim 1 wherein said shock absorbers operate in series with said primary airbag and protect the chassis during severe impact.

5. The reusable system of claim 4 wherein said shock absorbers include elements selected from the list of helical springs and leaf springs.

6. The reusable system of claim 4, further comprising a sensor for detecting activation of said shock absorbers and release of internal airbags for protection of personnel within the vehicle.

7. The reusable system of claim 1 wherein said remote sensor means is selected from the list of radar, sonar, optical and infrared detection means.

8. The reusable system of claim 1, wherein said inflation means for said airbag comprises a reservoir of compressed gas.

9. The reusable system of claim 8, wherein said reservoir of compressed gas is a gas cylinder that is replaceable and/or refillable.

10. The reusable system of claim 8, wherein said reservoir of compressed gas is coupled to a compressor powered by battery of said vehicle.

* * * * *